United States Patent
Kristensen et al.

(10) Patent No.: US 12,435,812 B2
(45) Date of Patent: Oct. 7, 2025

(54) PILOT CONTROLLED SOLENOID VALVE

(71) Applicant: Danfoss A/S, Nordborg (DK)

(72) Inventors: Søren Støttrup Kristensen, Horsens (DK); Varun Venugopalan Potti, Nordborg (DK)

(73) Assignee: DANFOSS A/S, Nordborg (DK)

( * ) Notice: Subject to any disclaimer, the term of this patent is extended or adjusted under 35 U.S.C. 154(b) by 11 days.

(21) Appl. No.: 18/574,176

(22) PCT Filed: Jun. 30, 2022

(86) PCT No.: PCT/EP2022/068141
§ 371 (c)(1),
(2) Date: Dec. 26, 2023

(87) PCT Pub. No.: WO2023/275289
PCT Pub. Date: Jan. 5, 2023

(65) Prior Publication Data
US 2024/0288090 A1    Aug. 29, 2024

(30) Foreign Application Priority Data

Jun. 30, 2021    (IN) .............................. 202111029478

(51) Int. Cl.
*F16K 31/40*    (2006.01)
(52) U.S. Cl.
CPC .................................. *F16K 31/408* (2013.01)
(58) Field of Classification Search
CPC .............................. F16K 31/404; F16K 31/408
See application file for complete search history.

(56) References Cited

U.S. PATENT DOCUMENTS 2,657,673 A * 11/1953 Littlefield ............. F16K 31/408
                                                         91/461
10,041,607 B2    8/2018 Becker et al.
(Continued)

FOREIGN PATENT DOCUMENTS

CN        201779280 U     3/2011
CN        201963999 U     9/2011
(Continued)

OTHER PUBLICATIONS

European Office Action for corresponding European Patent Application No. 21198401.8 dated Sep. 18, 2024.
(Continued)

*Primary Examiner* — Marina A Tietjen
(74) *Attorney, Agent, or Firm* — McCormick, Paulding & Huber PLLC

(57) ABSTRACT

A pilot controlled solenoid valve (1) includes a housing (2) having an inlet (3) and an outlet (4), a valve seat (5) between inlet (3) and outlet (4), a valve element (6) cooperating with the valve seat (5), and a solenoid arrangement (7) having a coil (8) and a moveable armature (9), wherein the valve element (6) is arranged between an inlet chamber (11) connected to the inlet (3) and a pilot pressure chamber (12) and includes a pilot channel (15) extending from the pilot pressure chamber (12) to the outlet (4), wherein the moveable armature (9) opens and closes an opening of the pilot channel (15) into the pilot pressure chamber (12) depending on magnetic forces produced by the coil (8). In such a valve noise should be kept small. To this end, pressure decreasing means are provided decreasing a pressure in the pilot pressure chamber (12) below a pressure downstream the valve seat (5) when the valve element (6) is lifted off from the valve seat (5)), wherein the pressure decreasing means are driven by a flow of a fluid from the inlet (3) to the outlet (4) controlled by the valve and are in form of a flow
(Continued)

restriction (17) in fluid connection with the pilot pressure chamber (12), wherein the flow restriction (17) is provided in addition to a flow restriction formed between valve element (6) and valve seat (5), wherein the flow restriction (17) includes a protrusion (16) of the valve element (6) protruding into the valve seat (5) when the valve element (6) is lifted off the valve seat (5) and a ring gap between the protrusion (16) and an inner wall of the outlet (4) is smaller than a distance between valve element (6) and valve seat (5) in a fully open condition of the valve, so that the area through which the fluid controlled by the valve (1) can pass is the smallest one on the way from the inlet (3) to the outlet (4).

20 Claims, 2 Drawing Sheets

(56) References Cited

U.S. PATENT DOCUMENTS

| | | |
|---|---|---|
| 2014/0264109 A1 | 9/2014 | DuHack et al. |
| 2022/0042729 A1 | 2/2022 | Larsen et al. |

FOREIGN PATENT DOCUMENTS

| | | | |
|---|---|---|---|
| CN | 202901303 U | 4/2013 | |
| CN | 105650326 A | 6/2016 | |
| CN | 106969187 A | 7/2017 | |
| CN | 106978547 A | 7/2017 | |
| CN | 107956911 A | 4/2018 | |
| CN | 112984194 A | 6/2021 | |
| CN | 216382762 U | 4/2022 | |
| DE | 2439271 A1 | 3/1976 | |
| DE | 3428096 A * | 3/1985 | ........... F16K 31/408 |
| DE | 10261120 A1 | 12/2002 | |
| EP | 0489331 A1 | 6/1992 | |
| EP | 0791939 A1 | 8/1997 | |
| EP | 1327809 A1 | 7/2003 | |
| EP | 2634275 B1 | 3/2017 | |
| EP | 3077713 B1 | 2/2019 | |
| EP | 3875811 A1 | 9/2021 | |
| EP | 4112984 A1 | 1/2023 | |
| JP | 2014152885 A | 8/2014 | |

OTHER PUBLICATIONS

International Search Report mailed on Oct. 12, 2022, in connection with corresponding International Application No. PCT/EP2022/068141; 4 pages.

* cited by examiner

PILOT CONTROLLED SOLENOID VALVE

CROSS-REFERENCE TO RELATED APPLICATIONS

This application is a National Stage application of International Patent Application No. PCT/EP2022/068141, filed on Jun. 30, 2022, which claims priority to Indian patent application Ser. No. 202111029478, filed Jun. 30, 2021, each of which is hereby incorporated by reference in its entirety.

TECHNICAL FIELD

The present invention relates to a pilot controlled solenoid valve comprising a housing having an inlet and an outlet, a valve seat between inlet and outlet, a valve element cooperating with the valve seat, and a solenoid arrangement having a coil and a moveable armature, wherein the valve element is arranged between an inlet chamber connected to the inlet and a pilot pressure chamber and comprises a pilot channel extending from the pilot pressure chamber to the outlet, wherein the moveable armature opens and closes an opening of the pilot channel into the pilot pressure chamber depending on magnetic forces produced by the coil.

BACKGROUND

Such a pilot controlled solenoid valve is known, for example, from CN 107 956 911 A. When the moveable armature closes the opening of the pilot channel into the pilot pressure chamber, a pressure corresponding to the pressure at the inlet can develop in the pilot pressure chamber and loads the valve element with a force directed towards the valve seat. In this situation the valve is closed. When, on the other hand, the moveable armature is moved away from the valve element and opens the opening of the pilot channel into the pilot pressure chamber, the pressure of the pilot pressure chamber decreases rapidly and the pressure at the inlet produces a force on the valve element in an opening direction which force exceeds the force on the valve element in closing direction and the valve opens.

A preferred field of use for such a valve is control of $CO_2$ having, for example, during hot gas defrost a high pressure of more than 100 bar and a rather high temperature of more than 100° C. Such a valve can be used in particular at a pressure of 140 bar and a temperature of 150° C.

A problem arises in this case, when the valve is mounted in a piping system close to a compressor, wherein the compressor produces pressure pulses in the gas or other fluid to be controlled by the solenoid valve. These pressure pulses can lead to a movement of the valve element in the housing which in turn produces noise and reduces lifetime of the valve.

CN 202901303 U shows a pilot controlled solenoid valve comprising a housing having an inlet and an outlet, a valve seat between inlet and outlet, a valve element cooperating with the valve seat and a solenoid arrangement having a coil and a moveable armature, wherein the valve element is arranged between an inlet chamber connected to the inlet and a pilot pressure chamber, and comprises a pilot channel extending from the pilot pressure chamber to the outlet, wherein the moveable armature opens and closes an opening of the pilot channel into the pilot pressure chamber depending on magnetic forces produced by the coil.

US 2014/0264109 A1 shows a valve mechanism, which is configured to minimize the generation of noise due to cavitation during operation. This means that a large pressure difference within the valve should be avoided. A pilot controlled solenoid valve comprises a housing defining an inlet and an outlet, a valve seat between inlet and outlet, a valve element cooperating with the valve seat, and a solenoid arrangement having a coil and a moveable armature, wherein the valve element is arranged between an inlet chamber connected to the inlet and a pilot pressure chamber and comprises a pilot channel extending from the pilot pressure chamber to the outlet, wherein the moveable armature opens and closes an opening of the pilot channel into the pilot pressure chamber depending on magnetic forces produced by the coil.

SUMMARY

The object underlying the invention is to improve lifetime.

This object is solved with a solenoid valve as described at the outset in that pressure decreasing means are provided decreasing a pressure in the pilot pressure chamber below a pressure downstream the valve seat when the valve element is lifted off from the valve seat.

When the pressure in the pilot pressure chamber is lowered, the valve element is reliably held in the maximum open position, so that pressure pulses at the inlet of the valve do not have the consequences that the valve element is moved and hits periodically against the housing. Thus, noise produced by the pressure pulses can be avoided and lifetime of the valve can be increased by reducing unwanted movements of the valve element.

The pressure decreasing means are driven by flow of a fluid from the inlet to the outlet controlled by the valve. Thus, the pressure decreasing means are operated by the fluid itself, so that no additional energy supply is necessary.

The pressure decreasing means are in form of a flow restriction in fluid connection with the pilot pressure chamber, where the flow restriction is provided in addition to a flow restriction formed between valve element and valve seat. The flow restriction is used to produce a kind of venturi effect. The fluid is accelerated when passing the flow restriction. This leads to a pressure decrease shortly after passing the restriction. This pressure decrease propagates to the pilot pressure chamber and lowers the pressure in the pilot pressure chamber.

The flow restriction comprises a protrusion of the valve element protruding into that valve seat when the valve element is lifted off the valve seat. The protrusion together with the valve seat, more precisely the inner wall of an opening surrounded by the valve seat, form a ring-like area through which the fluid has to pass. When the protrusion ends, the fluid can expand which in turn leads to the decreased pressure.

A width of a ring gap between the protrusion and an inner wall of the outlet is smaller than a distance between valve element and valve seat in a fully open condition of the valve. The flow restriction is limited to the gap between protrusion and inner wall of the valve seat.

In an embodiment of the invention the fluid connection is established via the pilot channel. In other words, the pressure drop is produced at the opening of the pilot channel into the valve seat and the lowered pressure propagates to the pilot chamber via the pilot channel. No additional channels are necessary to decrease the pressure in the pilot pressure chamber.

In an embodiment of the invention the pilot channel runs through the protrusion. Thus, the opening of the pilot channel is located exactly at the position at which the pressure of the fluid is decreased.

In an embodiment of the invention the valve element is in form of a piston. This is in particular useful in connection with the high pressures mentioned at the beginning.

In an embodiment of the invention the valve element comprises a flow channel which is provided between the inlet chamber and the pilot pressure chamber and has a larger flow resistance than the pilot channel. The flow channel is used to allow the pressure at the inlet to propagate into the pilot pressure chamber once the moveable armature closes the opening of the pilot channel into the pilot pressure chamber to generate a pressure in the pilot pressure chamber that acts on the valve element in the closing direction of the valve element, whereby it contributes to the closing forces on the valve element. The arrangement of the flow channel in the piston simplifies the construction of the valve, since such a flow channel is not necessary in the housing.

BRIEF DESCRIPTION OF THE DRAWINGS

A preferred embodiment of the invention will now be described with reference to the drawing, wherein.

DETAILED DESCRIPTION

Figures 1, 2:
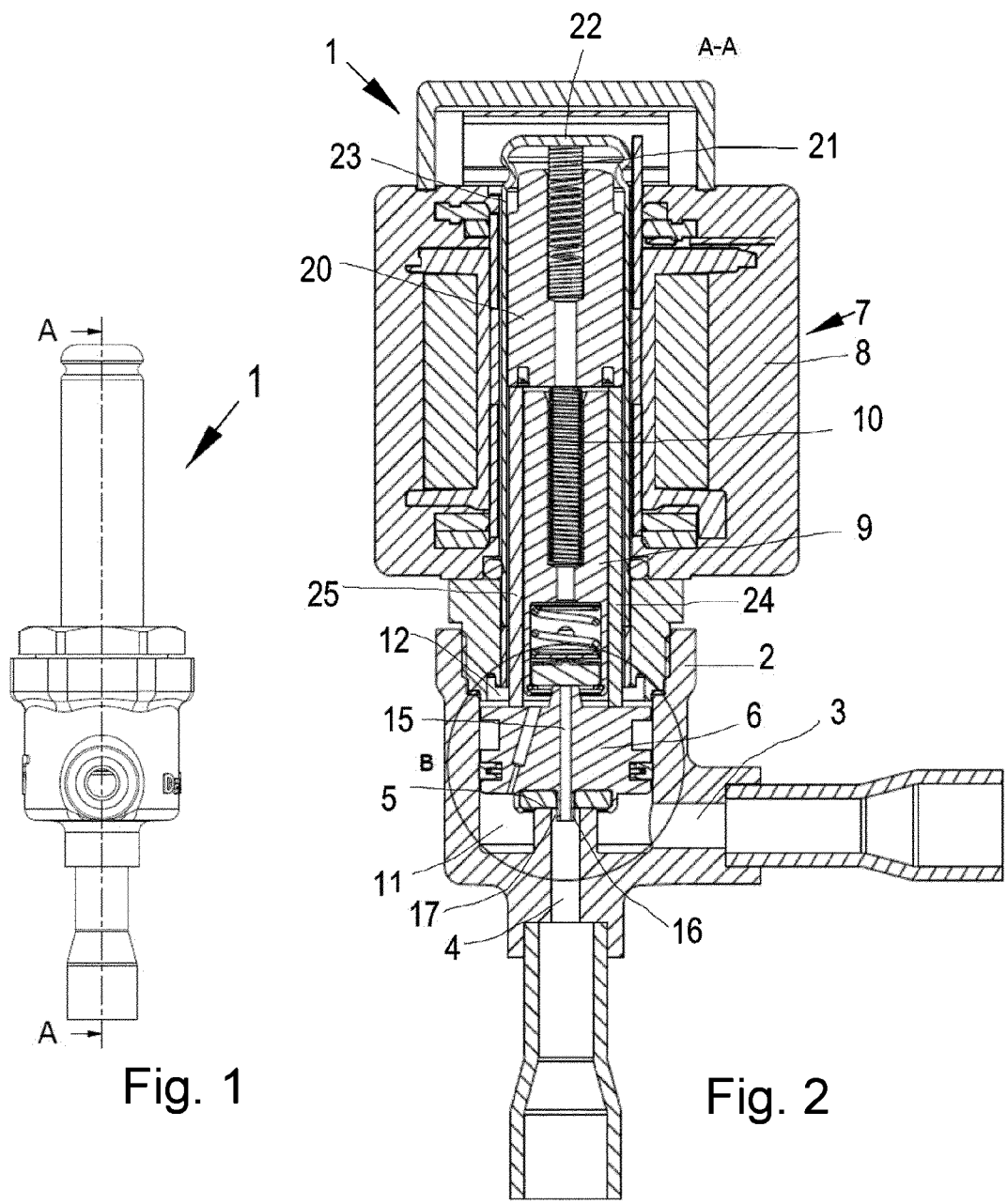
FIG. 1 shows a side view of a pilot controlled solenoid valve.
FIG. 2 shows a section A-A of FIG. 1.
Figure 3:
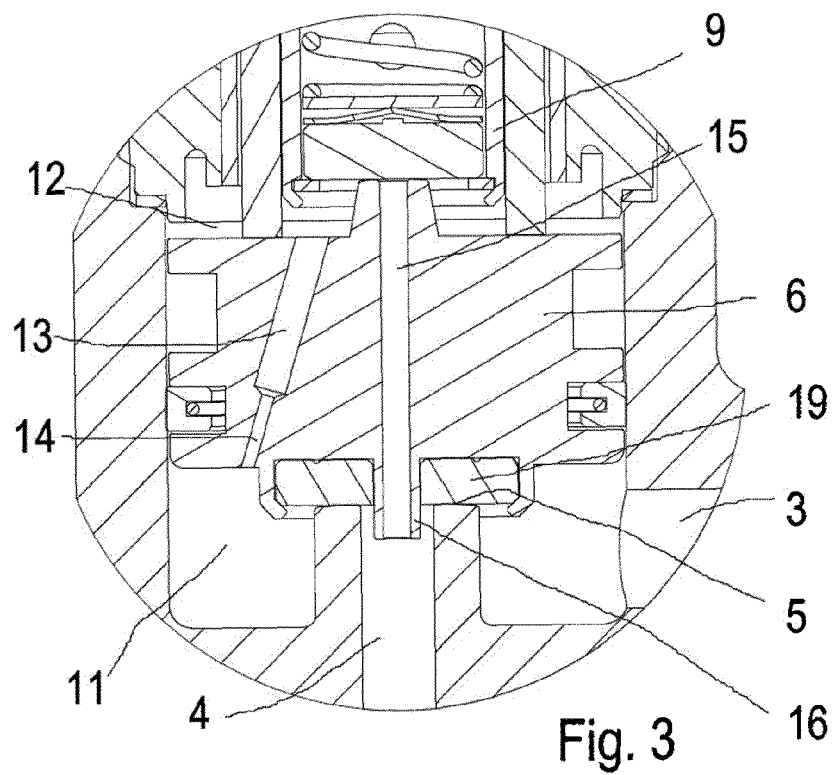
FIG. 3 shows an enlarged view of detail B of FIG. 2.

A pilot controlled solenoid valve 1 comprises a housing 2 having an inlet 3 and an outlet 4. A valve seat 5 is provided between inlet 3 and outlet 4. A valve element 6 cooperates with the valve seat 5, i.e. it can be moved in a direction towards the valve seat 5 until it contacts the valve seat 5 to close the valve 1 or it can be moved away from the valve seat 5 in order to open the valve 1.

The valve 1 furthermore comprises a solenoid arrangement 7 having a coil 8 and a first moveable armature 9. The moveable armature 9 is loaded by a spring 10 in a direction towards the valve element 6.

The valve element 6 is arranged between an inlet chamber 11 connected to the inlet 3 and a pilot pressure chamber 12. The inlet chamber 11 and the pilot pressure chamber 12 are connected by means of a flow channel 13 which comprises a flow restriction 14. The flow channel 13 is arranged in the valve element 6.

The valve element 6 furthermore comprises a pilot channel 15 connecting the pilot pressure chamber 12 and the outlet 4.

Figure 4:
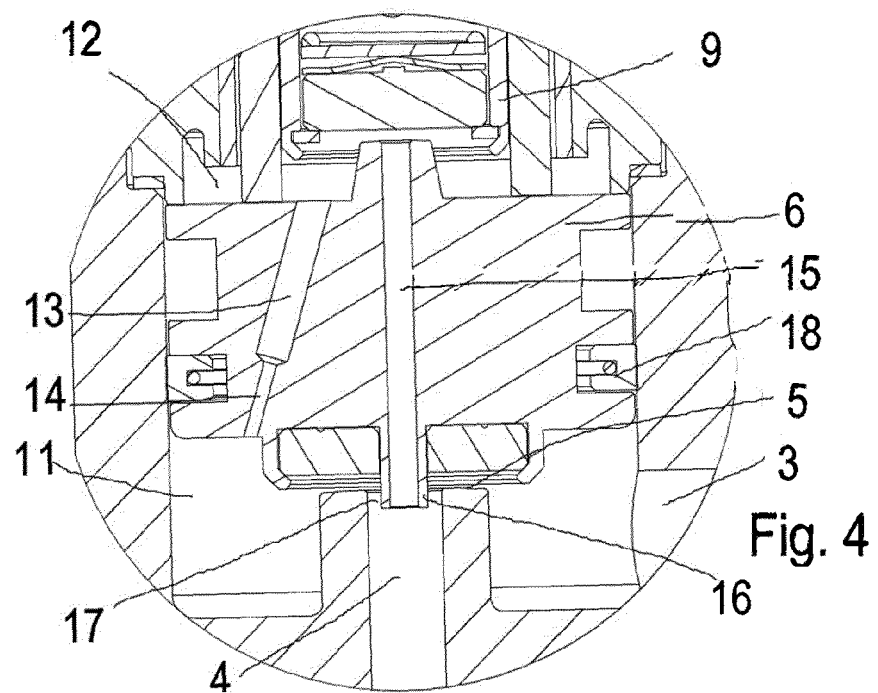
FIG. 4 shows a similar view as FIG. 3, however, with the valve in open condition.

The valve element 6 comprises a protrusion 16 extending into the outlet 4 even when the valve element 6 has been lifted off the valve seat 5, as shown in FIG. 4. The pilot channel 15 runs through the protrusion 16. The protrusion 16 forms together with the outlet 4 a flow restriction 17 in form of a ring gap between the protrusion 16 and the inner diameter of the valve seat 5 in addition to the flow restriction formed between valve element 6 and valve seat 5. In the flow restriction 17 the area through which the fluid controlled by the valve 1 can pass is the smallest one in the way from the inlet 3 to the outlet 4. This is achieved in that the width of the ring gap, i.e. a difference between inner diameter and outer diameter of the ring gap, is smaller than the distance between the valve element 6 and the valve seat 5 in a fully open condition of the valve 1.

The valve 1 comprises a second movable armature 20 which is loaded by a second spring 21 arranged between the second armature 20 and a bottom 22 of a tube 23 in which the two armatures 9, 20 are arranged. Spring 10 is arranged between the two armatures 9, 20. Two pins 24, 25 are arranged between the second armature 20 and the valve element 6 to keep the distance between the second armature 20 and the valve element 6 constant. The second armature 20 can be termed "upper armature" and the first armature 9 can be termed "lower armature".

The operation of the solenoid valve can be described as follows:

When the moveable armature 9 closes the opening of the pilot channel 15 into the pilot pressure chamber 12, pressure from the inlet 3 propagates from the inlet chamber 11 through the flow channel 13 into the pilot pressure chamber 12, so that the pressure in the pilot pressure chamber 12 increases and produces a force onto the valve element 6 moving the valve element 6 towards the valve seat 5. The valve 1 is closed. In addition the forces of the two springs 10, 21 contribute with a force in closing direction, however this force is significantly smaller than the force generated by the pressure in the pilot pressure chamber 12.

When the valve 1 is to be opened, the first moveable armature 9 is moved away from the valve element 6 opening a connection between the pilot pressure chamber 12 and the pilot channel 15. The pilot channel 15 is connected to the outlet 4, so that the pressure in the pilot pressure chamber 12 is lowered to the pressure at the outlet 4. Thus, the pressure in the inlet chamber 11 is larger than the pressure in the pilot pressure chamber 12 and the force produced by the pressure in the inlet chamber 11 acting on the valve element 6 in opening direction is larger than a force in the opposite direction. The valve element 6 is lifted off the valve seat 5 and the valve 1 opens.

In other words: When the valve is closed as shown in FIG. 2 and current is send through the coil 8 of the valve 1 the first moveable armature 9 will move and engage the second movable armature 20. Hereby the pilot valve will open and the pressure in the pilot pressure chamber will become lower than in the inlet chamber 11. The second armature 20, the first armature 9 and the valve element 6 are then being pushed upwards by the force generated by the pressure in the inlet chamber 11, whereby the valve seat 5 is opened. The upper armature 20 and the valve element 6 are kept apart by the two pins 24. 25 surrounded by the lower armature 9. The way the valve is opened allows for a significant maximum opening pressure difference because the upper and lower armature are located closed to each other. It furthermore allows for a significant displacement of the valve element 6 because the valve element 6, the lower armature 9 and the upper armature 20 are displaced in common.

The fluid flowing from the inlet 3 to the outlet 4 has to pass the flow restriction 17. In this flow restriction 17 the flow of fluid is accelerated. After passing the flow restriction 17 the fluid can expand. This expansion leads to a lowering of the pressure, in other words a pressure decrease. The pressure decreases below a pressure immediately downstream the valve seat 5. This pressure decrease is produced at the opening of the pilot channel 15 into the outlet 4. Consequence is that the lowered pressure propagates to the pilot pressure chamber 12, so that the pressure in the pilot pressure chamber 12 is decreased further so that the valve element 6 is reliably held in the fully open position. Pressure pulses in the fluid do not produce a movement of the valve element so that noise produced by such a movement can be avoided.

The pressure is decreased by the flow of the fluid itself, so that no additional means are necessary.

The valve element 6 in form of a piston can be provided with a piston ring 18 sealing the inlet chamber 11 against the pilot pressure chamber 12, so that a fluid connection is possible only over the flow channel 13.

Furthermore, the valve element 6 can be provided with a sealing element 19 in a region contacting the valve seat 5.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A pilot controlled solenoid valve comprising a housing having an inlet and an outlet, a valve seat between inlet and outlet, a valve element cooperating with the valve seat, and a solenoid arrangement having a coil and a movable armature, wherein the valve element is arranged between an inlet chamber connected to the inlet and a pilot pressure chamber and comprises a pilot channel extending from the pilot pressure chamber to the outlet, wherein the movable armature opens and closes an opening of the pilot channel into the pilot pressure chamber depending on magnetic forces produced by the coil, wherein pressure decreasing means are provided for decreasing a pressure in the pilot pressure chamber below a pressure downstream the valve seat when the valve element is lifted off from the valve seat, wherein the pressure decreasing means are driven by a flow of a fluid from the inlet to the outlet controlled by the valve and are in form of a flow restriction in fluid connection with the pilot pressure chamber, wherein the flow restriction is provided in addition to a flow restriction formed between valve element and valve seat, wherein the flow restriction comprises a protrusion of the valve element protruding into the valve seat when the valve element is lifted a distance off the valve seat and a ring gap which is formed between the protrusion and an inner wall of the outlet in a fully open condition of the valve, wherein a width of the ring gap is smaller than the lift off distance between the valve element and the valve seat in the fully open condition of the valve, so that the area of the flow restriction in fluid connection with the pilot pressure chamber through which the fluid controlled by the valve can pass is the smallest one on the way from the inlet to the outlet; and that the valve comprises a second movable armature, wherein the movable armature and the second movable armature are arranged within a tube, wherein a spring is arranged between the two movable armatures, wherein the second movable armature is loaded by a second spring arranged between the second movable armature and a bottom of the tube, and wherein two pins are arranged between the second movable armature and the valve element for keeping a distance between the second movable armature and the valve element constant.

2. The valve according to claim 1, wherein the fluid connection is established via the pilot channel.

3. The valve according to claim 1, wherein the pilot channel runs through the protrusion.

4. The valve according to claim 1, wherein the valve element is in form of a piston.

5. The valve according to claim 1, wherein the valve element comprises a flow channel which is provided between the inlet chamber and the pilot pressure chamber and has a larger flow resistance than the pilot channel.

6. The valve according to claim 5, wherein the flow channel is arranged in the valve element and comprises a flow restriction.

7. The valve according to claim 5, wherein the valve element is provided with a piston ring sealing the inlet chamber against the pilot pressure chamber so that a fluid connection is possible only over the flow channel.

8. The valve according to claim 1, wherein the moveable armature is loaded by the spring in a direction towards the valve element.

9. The valve according to claim 2, wherein the pilot channel runs through the protrusion.

10. The valve according to claim 2, wherein the valve element is in form of a piston.

11. The valve according to claim 3, wherein the valve element is in form of a piston.

12. The valve according to claim 2, wherein the valve element comprises a flow channel which is provided between the inlet chamber and the pilot pressure chamber and has a larger flow resistance than the pilot channel.

13. The valve according to claim 3, wherein the valve element comprises a flow channel which is provided between the inlet chamber and the pilot pressure chamber and has a larger flow resistance than the pilot channel.

14. The valve according to claim 4, wherein the valve element comprises a flow channel which is provided between the inlet chamber and the pilot pressure chamber and has a larger flow resistance than the pilot channel.

15. The valve according to claim 5, wherein the valve element is provided with a piston ring sealing the inlet chamber against the pilot pressure chamber so that a fluid connection is possible only over the flow channel.

16. The valve according to claim 6, wherein the valve element is provided with a piston ring sealing the inlet chamber against the pilot pressure chamber so that a fluid connection is possible only over the flow channel.

17. A pilot controlled solenoid valve comprising a housing having an inlet and an outlet, a valve seat between inlet and outlet, a valve element cooperating with the valve seat, and a solenoid arrangement having a coil and a first movable armature,
wherein the valve element is arranged between an inlet chamber connected to the inlet and a pilot pressure chamber and includes a pilot channel extending from the pilot pressure chamber to the outlet,
wherein the first movable armature opens and closes an opening of the pilot channel into the pilot pressure chamber depending on magnetic forces produced by the coil,
wherein a pressure decreasing means is provided for decreasing a pressure in the pilot pressure chamber when the valve element is lifted off from the valve seat and the valve is in a fully open condition,
wherein the pressure decreasing means is driven by a flow of a fluid from the inlet to the outlet controlled by the valve,
wherein the pressure decreasing means is a flow restriction provided when the valve element is in the fully open condition, the flow restriction including a ring gap which is formed between a protrusion protruding into the outlet and an inner wall of the outlet,
wherein a width of the ring gap between the protrusion and the inner wall is smaller than a lift off distance between the valve element and the valve seat in the fully open condition of the valve, so that an area of the ring gap is smaller than an area between the valve element and the valve seat in the fully open condition of the valve, wherein the flow restriction formed by the ring gap results in a decrease of a pressure of a flow of the fluid at a downstream end of the protrusion as compared to the pressure of the flow of the fluid immediately downstream of the valve element and the valve seat in the fully open condition of the valve, and wherein the decreased pressure is in fluid connection with the pilot pressure chamber.

18. The valve according to claim 17, wherein the solenoid valve further comprises a second movable armature, wherein the first armature and the second movable armature are arranged within a tube, wherein a spring is arranged between the two movable armatures, wherein the second movable armature is loaded by a second spring arranged between the second movable armature and a bottom of the tube, and wherein at least one pin is arranged between the second movable armature and the valve element for keeping a distance between the second movable armature and the valve element constant.

19. The valve according to claim 17, wherein the valve element comprises a flow channel which is provided between the inlet chamber and the pilot pressure chamber and has a larger flow resistance than the pilot channel.

20. The valve according to claim 19, wherein the valve element is provided with a piston ring sealing the inlet chamber against the pilot pressure chamber so that a fluid connection is possible only over the flow channel.

* * * * *